United States Patent Office 3,121,512
Patented Feb. 18, 1964

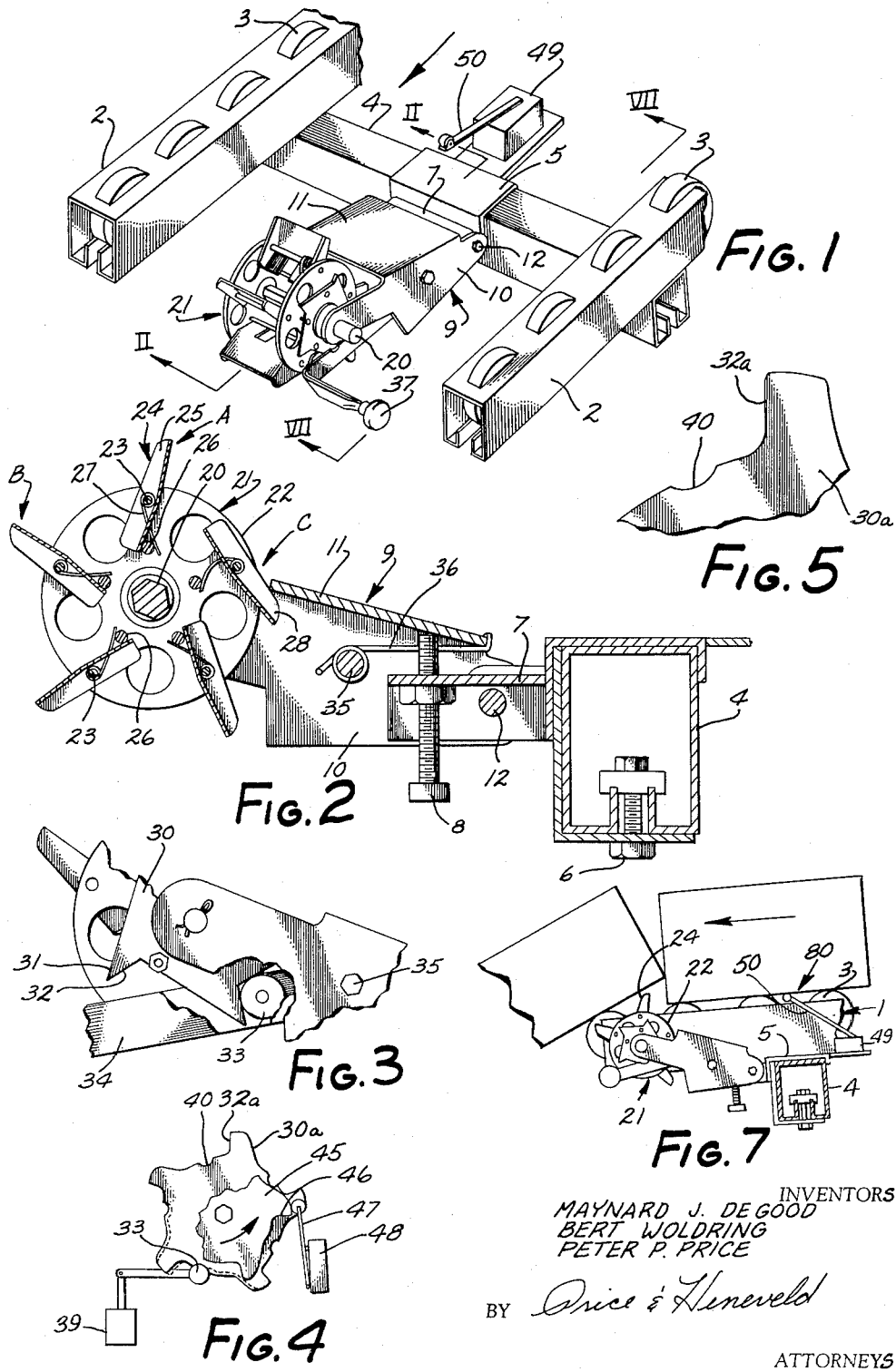
Feb. 18, 1964  M. J. DE GOOD ETAL  3,121,512
ARTICLE RELEASE
Filed Aug. 28, 1961  2 Sheets-Sheet 1
INVENTORS
MAYNARD J. DE GOOD
BERT WOLDRING
PETER P. PRICE
BY *Price & Heneveld*
ATTORNEYS

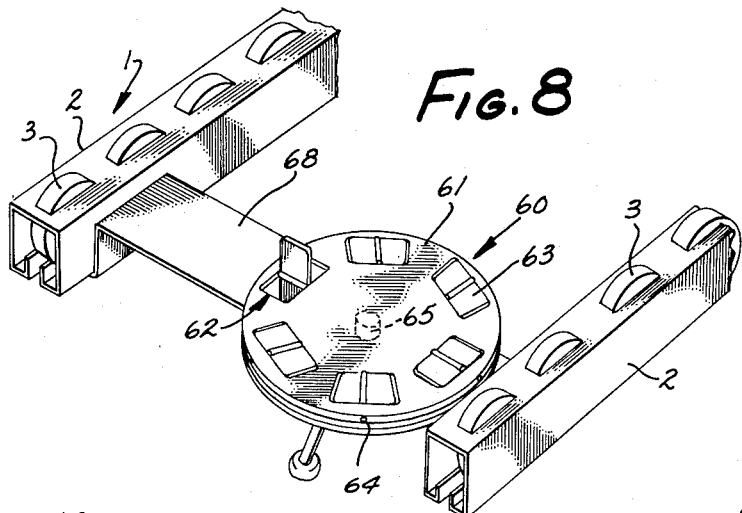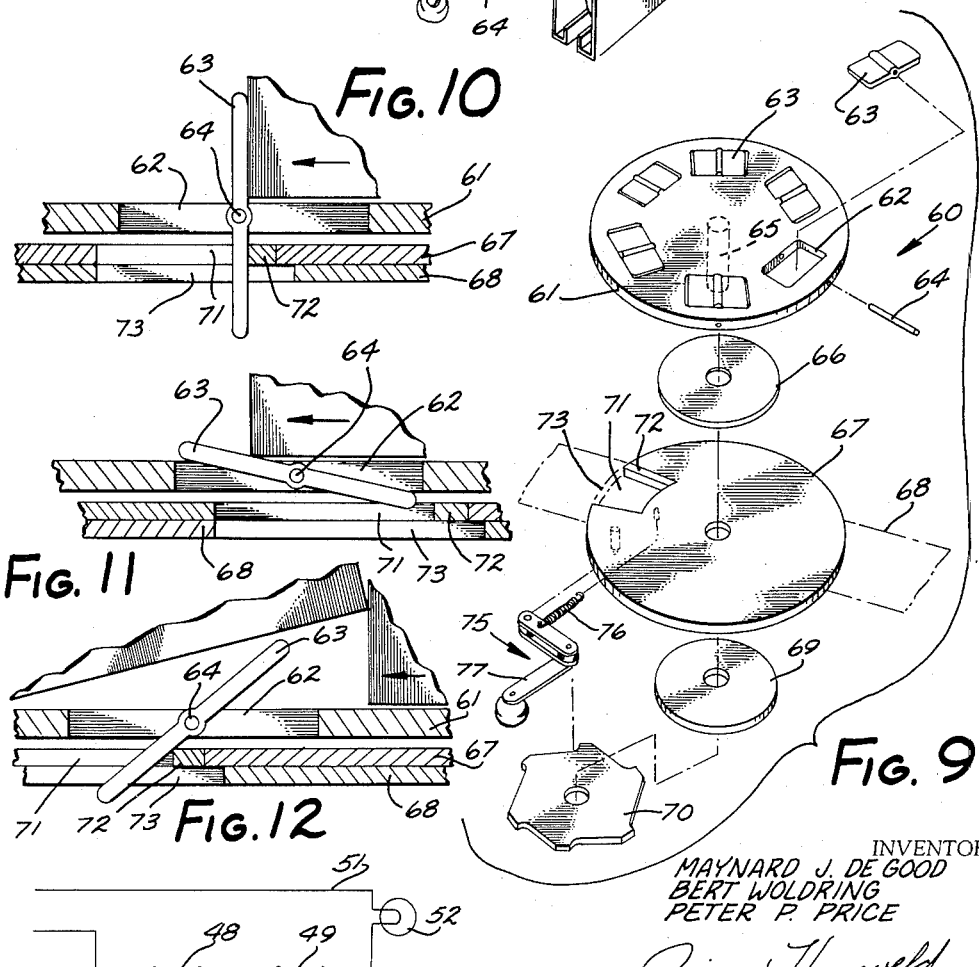

3,121,512
ARTICLE RELEASE
Maynard J. De Good and Bert Woldring, Grand Rapids, and Peter P. Price, Cascade Township, Kent County, Mich., assignors to The Rapids-Standard Company, Inc., Grand Rapids, Mich., a corporation of Michigan
Filed Aug. 28, 1961, Ser. No. 134,227
3 Claims. (Cl. 221—295)

This invention relates to conveyors and more particularly to the controlled release of articles from live storage racks.

In recent years the use of so-called live storage has been greatly increased. This is the storage of articles on tracks with the articles biased toward one end of the track either by gravity or by some type of power means. At the discharge end of the track, the articles are removed one by one as needed. Originally these articles were removed manually one by one. As one article was removed, the remaining articles on the rack moved forward against the stop so that the next article in line was ready for removal. However, in many cases today, manual removal of articles has been replaced by semi- or fully automatic discharge. Where semi-automatic discharge is used, the operator trips a lever or actuates a switch which causes a mechanism to release one article from the end of the rack and then automatically blocks the forward movement of the following article. Where fully automatic release is utilized, the same basic mechanism is employed but the actuation of the release mechanism may be controlled from a remote station.

However, irrespective of whether the release is semi-automatic or fully automatic, it is vitally important that the release be accurate in discharging the articles one by one. Many article discharge control mechanisms have been devised. These vary from extremely simple to extremely complex and costly. These mechanisms, however, have almost universally been plagued with the problem of their inability to positively release the articles one by one. When the articles are closely packed, it sometimes happens that several articles will pass the release mechanism before the mechanism can react to block the flow of the articles moving down the track toward the discharge end. This results in a number of difficulties. Among these difficulties is shipment of improper quantities unless the shipment is manually checked. It also results in falsification of inventory schedules. It necessitates return of excess articles to the storage racks. To prevent overshipment or delivery of articles, each load is carefully checked to determine that the release mechanisms have operated correctly. The necessity for this checking largely nullifies the economic advantage of such automatic releases. This invention is designed to eliminate this problem.

Inaccuracy in controlling the number of articles discharged is particularly characteristic of the non-powered type of releases. However, when the releases are powered to reduce the instances of inaccuracy, the mechanisms become bulky and expensive. By reason of their complexity, they are more prone to operational failure and entail greater maintenance costs.

This invention overcomes these difficulties by providing a release mechanism which will positively and accurately separate each article so that only one article is released each time the mechanism is tripped. Thus, it overcomes the problem of excessive discharge. Further, it accomplishes this goal without the use of an independent power mechanism. The release is entirely powered by the force of the articles which move down against it along the track of the storage rack. Thus, it is relatively inexpensive and its simplicity materially reduces the possibility of operational failure.

Another of the problems which has occurred in both the powered and nonpowered release mechanisms is that of hang-up. All too frequently the mechanism, having released the lead article in the rack, attempts to move back into article blocking or intercepting position only to ride up under the next article. In many types this causes the release to lift the article partially off the track where the weight of the article will prevent the release from operating the next time it is tripped. This results in a complete failure to discharge articles rather than in over-discharge of articles. This also is a serious problem. In other types of releases where independent power means is used for the release, the release may be brought up against the article with such force that it damages the carton and sometimes damages the contents of the carton. This of course also results in substantial difficulty for the warehouse operator.

This invention overcomes this difficulty by providing a mechanism which cannot ride up under the carton to be intercepted and thus it cannot lift the carton, gouge it or damage it in any other way. At the same time it positively assures the interception mechanism moving into article or carton intercepting position before the lead article is completely discharged and thus it is in position to positively intercept the next article even before that article reaches the end of the storage track.

Another significant problem, although of lesser consequence than the others in connection with existing release mechanisms, is their bulk. Live storage racks are usually arranged in tiers one above the other in large banks. As such the particular area allotted each rack should, at optimum, be no more than that necessary to receive the article. However, many release mechanisms have a silhouette of such size that each individual rack must be greatly enlarged to prevent interference between the release mechanism and the articles in the rack below. This invention reduces the size of the release mechanisms so that their silhouettes are practically confined within the vertical silhouette of the supporting track within the rack. Therefore, they do not require the racks to be larger than that necessary to store the particular article. This is a material saving in warehousing space, thus reducing the initial cost of a warehouse of a given capacity as well as making the warehouse more efficient.

These and other objects and purposes of this invention will be immediately seen upon reading the following specification and the accompanying drawings.

FIG. 1 is a fragmentary, oblique view of the end of the track of a live storage rack illustrating the invention in operating position.

FIG. 2 is an enlarged, sectional, elevational view taken along the centerline of the release mechanism as indicated by the plane II—II of FIG. 1.

FIG. 3 is an enlarged, fragmentary, partially broken view of the ratchet mechanism which controls the operation of the release.

FIG. 4 is a sectional, elevational, partially broken view of a modified indexing or ratchet mechanism for this invention.

FIG. 5 is a fragmentary, enlarged view of one of the dwell teeth of the mechanism illustrated in FIG. 4.

FIG. 6 is a schematic wiring diagram of the article indicating signal utilized with the mechanism illustrated in FIGS. 4 and 5.

FIG. 7 is a sectional, elevational view of the storage rack illustrated in FIG. 1 taken along the plane VII—VII of FIG. 1.

FIG. 8 is a fragmentary, oblique view of a modified form of this invention.

FIG. 9 is an oblique, exploded view of the release mechanism illustrated in FIG. 8.

FIG. 10 is an enlarged, fragmentary, sectional, elevational view of one of the article interceptors of the release mechanism illustrated in FIG. 8 shown in erected position.

FIG. 11 is an enlarged, fragmentary, sectional elevational view of one of the article interceptors of the release mechanism illustrated in FIG. 8 moving into retracted position under the influence of an article.

FIG. 12 is an enlarged, fragmentary, sectional, elevational view of one of the article intercepters of the release mechanism illustrated in FIG. 8 shown as it is moving from retracted to erected position.

In executing the objects and purposes of this invention, a release mechanism is provided, which in one form utilizes a rotor mounted for rotation about a horizontal axis. This rotor is equipped with a plurality of article intercepting elements which snap up into article intercepting position as they move to the top of the rotor. The rotor is equipped with a ratchet which holds the rotor against rotation each time one of the article interception elements reaches the top of the rotor where it will intercept an article. Upon release of the ratchet mechanism, the rotor is permitted to turn approximately one-fifth of its circumference, moving the intercepting one of the intercepting elements down into inoperative position and permitting the article to pass over it. As this occurs, the next intercepting element is moved up into position. As it moves up it is held in depressed position until the article has had an opportunity to move forward sufficiently so that it begins to tip off the track. This permits the next interception element to erect itself in the path of the next oncoming article. In the other form of this invention, the same principles are employed but the rotor instead of turning about a horizontal axis rotates about a vertical axis.

Referring specifically to the drawings, the numeral 1 refers to a track typical of the type used in so-called "live storage," i.e., storage in which the articles are supported on a conveyor-type surface and removal of an article from the discharge end of the track will cause the remaining articles on the track to move automatically toward the end from which the article was removed. The track may be of many different constructions, but in the form illustrated consists of a pair of rails 2. Each of the rails 2 is generally U-shaped in cross section and is equipped with a plurality of spaced conveyor wheels 3. These are freely rotatable and collectively form a low-friction article supporting surface. The rails are arranged to slope at a small angle toward the discharge end of the track, biasing the articles to move in the direction indicated by the arrow in FIG. 1.

At a short distance back from the ends of the rails 2 they are joined by a crosspiece 4. Mounted on the crosspiece is a base fitting 5 which preferably engages about the crosspiece and is locked into place by the nut and bolt assembly 6 (FIG. 2). The base fitting has an arm 7 extending therefrom in the direction of movement of articles on the track 1. Adjacent its free end, the arm 7 threadedly mounts a vertical adjustment screw 8. The arm also supports a hanger 9. The hanger 9 has a pair of side plates 10 joined at their top by the restraining plate 11. One end of the hanger 9 is pivotally secured to the arm 7 by the rocker pin 12 between the crosspiece 4 and the adjustment screw 8.

The other ends of the side plates 10 are joined by a rotor shaft 20. The rotor shaft is non-circular except its ends journal in the side plates. These ends of the shaft are circular, permitting it to rotate with respect to the side plates 10. The rotor shaft 20 mounts and supports the rotor 21 between the side plates 10.

The rotatable member of rotor 21 has a pair of terminal plates 22 spaced apart along the rotor shaft 20 and locked thereto for rotation with the shaft. The terminal plates 22 are joined by a plurality of pivot pins 23. The pivot pins 23 are arranged adjacent the periphery of the terminal plates and are equally spaced about the rotor. In the particular embodiment shown, five of the pivot pins are employed. Each of the pivot pins pivotally mounts a paddle or stop plate 24. The plates 24 constitute the article interception elements of the device. These plates in the embodiment shown have a main body portion extending substantially the full width between the terminal plates 22 and have flanged sides 25. Each of the stop plates 24 is pivotally mounted on one of the pivot pins 23 with the pins passing through the flanged sides 25 of the plate.

Radially inwardly of the pivot pins 23, stop pins 26 are secured between the terminal plates 22. One of the stop pins 26 is provided for each of the stop plates 24 and is so located that it intercepts the inner end of the stop plate 24 as the plate swings to erected position. The stop plates 24 are each biased into erected or generally radially extending position by a spring 27. The upward or erection movement of the stop plate 24 is limited by the stop pin 26. The outer ends of the flanged sides of the stop plates 24 are radiused at 28. This improves their action when they are depressed into retracted position as they move past the restraining plate 11 (FIG. 2).

Also mounted on the rotor shaft 20 is a ratchet 30 (FIGS. 1 and 3). The ratchet has the same number of teeth as there are stop plates 24 in the rotor assembly 21. The ratchet 30 is secured to the shaft for rotation with the shaft whereby it controls the rotary movement of the rotor 21. Each of the teeth 31 of the ratchet 30 is so shaped as to form a stop shoulder 32 facing in the direction of rotation of the rotor 21 and adapted to engage the check member 33 on handle 34. Preferably the check member 33 is a wheel mounted for free rotation on the handle to facilitate the operation of the handle when the rotor is under pressure from articles on the track 1. The handle 34 is pivotally mounted at one end about the rocker bolt 35 and is biased upwardly into engagement with the ratchet 30 by the spring 36 (FIG. 2). The outer or free end of the handle 34 is provided with a suitable manual grip 37 (FIG. 1). It will be recognized that where automatic operation is desired that a suitable connection to a solenoid 39 or pneumatic cylinder or other motivating mechanism may be substituted for the grip 37 (FIG. 4).

In some instances it may be desirable to provide registration means operated by the release mechanism to signal the presence of an article at the release mechanism. Such an arrangement is illustrated in FIGS. 4 and 5. In this case, the ratchet 30a is modified to provide a dwell pocket 40 just ahead of each of the stop surfaces 32a. The dwell pocket 40 is a slight depression in the edge of the ratchet which will seat and trap the check member 33. It is so designed that any momentum remaining in the rotor from the discharge of the last package or article will be exhausted or absorbed in trying to move the stop member 33 from the dwell pocket. This stops the rotation of the ratchet and rotor before the stop member 33 makes contact with the adjacent surface 32a unless anless another article has moved down to bear against the rotor.

In this arrangement a second ratchet-like wheel is mounted on the shaft 20. This is the detector wheel 45 which has cam-like teeth 46 equal in number to the number of ratchet teeth on the ratchet 30a. Each of the cam teeth 46 has one abrupt surface facing oppositely from the direction of rotation of the detector wheel. The cam teeth are so arranged with relation to the teeth on the ratchet wheel 30a that the switch arm 47 will be permitted to drop into the pocket at the base of the abrupt face of the tooth just as the stop member 33 seats against the stop face 32a of one of the teeth on the ratchet. Thus, when the check member 33 comes to rest in one of the dwell pockets 40, one of the cam teeth 46 will hold the switch arm 47 in depressed or radially outward position. The switch arm 47 actuates the switch 48.

The switch 48 is used in connection with a second switch 49 mounted in the track 1 a short distance inwardly of the rack from the rotor 21 (FIG. 1). The switch 49 has an upstanding arm 50 which extends slightly above the conveying surface formed by the wheels 3 whereby an article passing along the track 1, as it passes over the switch 49, will depress the arm 50 to actuate the switch. As indicated in FIG. 6, the switches 48 and 49 are mounted in series in a circuit 51 which includes the indicator light 52. The switch 48 is designed to be closed when the arm 47 is seated at the base of one of the cam teeth 46. The switch 49 is designed to be closed only when the arm 50 is depressed. Thus, provided the arm 50 is not depressed or the arm 47 is bearing against the top of one of the cam teeth 46, the circuit to the indicator lamp 52 will be interrupted and the lamp will go out. This indicates that for some reason an article is not bearing against the release mechanism for discharge upon tripping of the release mechanism.

This arrangement is particularly designed for remote operation. In many circumstances the operator of the storage facilities is positioned at a central control point. The indicating system is then desirable to warn the operator that either the particular rack is empty or that an article is hung up on it. The second switch 49 is precautionary because it prevents a false reading should the rotor, for some reason, be turned to the next stop by the last article discharged.

Referring specifically to FIGS. 8–12, it will be seen that the case stop herein illustrated is designed for rotation about a vertical axis rather than about a horizontal axis. It provides a case stop of substantially reduced vertical silhouette. Thus, the height of each bay of the storage rack need be no greater than that necessary to provide clearance for the articles stored on the track 1.

As best seen in FIGS. 9 and 10, the release 60 has a top plate 61 provided with a plurality of generally rectangular apertures 62 equally spaced adjacent its periphery. Seated in each of these apertures 62 is a case stop 63. These are the article interception elements of the modified device. Each of the case stops 63 is rotatably mounted on a pivot pin 64. The ends of the pin 64 are seated in suitable openings in the walls of the aperture with the pin passing through the center of the case stop 63. The size of the case stop 63 is such that they may rotate about the pin 64 without interference with the walls of the aperture 62.

The top plate 61 is securely affixed to a shaft 65 so that the two parts rotate together. The shaft 65 passes through a spacer 66, the bottom plate 67, the cross piece 68, the lower spacer 69 and is securely affixed to the ratchet wheel 70. The ratchet wheel 70 rotates with the shaft. The shaft 65 is freely rotatable with respect to the spacers 66 and 69, the lower plate 67 and the support 68.

The lower plate 67 has a single peripheral notch 71. One edge wall of the notch is provided with a permanent magnet 72. The notch 71 is so located that the magnet 72 is in contact with one end of one of the case stops 63 when the pivot pin 64 of that case stop is normal to the direction of flow of articles along the track 1. The size of the notch 71 is such that the case stops 63 may rotate through it. Since the magnet 72 is secured to the lower plate 67, the lower plate 67 should be of a non-magnetic material.

The lower plate 67 is securely affixed to the support 68 and is thereby held against rotation. The support 68 has an opening 73, designed to align with the notch 71 in the lower plate 67 to provide clearance for the movement of the case stops 63. The opening 73 is larger than the notch 71 so there will be no contact between the support 68 and the magnet 72. The support 68 is secured between the tracks 2 and is so positioned, vertically, that one end of a case stop 63, when erected, is in the path of the articles moving along the track while the upper plate 61 and the case stops, when retracted, are sufficiently below the articles that clearance is provided.

The lower spacer 69 is provided between the support 68 and the ratchet wheel 70. Movement of the ratchet wheel 70 is controlled by the pawl assembly 75, one end of which is pivotally secured to the support 68. The pawl assembly 75 is biased into engagement with the ratchet wheel 70 by a spring 76. To permit the pawl assembly 75 to be manually manipulated, it is equipped with a handle 77. It will be recognized that where automatic operation is desired suitable operating means such as a solenoid may be substituted for the handle 77.

It will also be recognized that the automatic indicating mechanism, such as that illustrated in FIGS. 4, 5 and 6 may be combined with the case release mechanism 60 in a manner which is clearly understandable from the disclosure in connection with the case release 21.

*Operation*

Considering first case release 21 illustrated in FIGS. 1 through 3 and 7, the articles are normally loaded at the back or upper end of the storage rack. They move by gravity along the track 1 until they engage one of the case stop plates 24 of the case release. The surface of the bottom of an article traveling over the wheels 3 passes above the terminal plates 22 but permits a substantial portion of the stop plates 24 to engage the article.

Engagement with one of the stop plates 24 immediately halts forward movement of the article because the case stop plate 24 cannot rotate about its pivot pin due to the engagement of its inner end with one of the stationary pins 26. Since the entire case release 21 is held against rotation by engagement between the ratchet 30 and the check member 33, the article is held against further forward movement.

To release the article, the handle 34 is depressed, disengaging the stop member 33 from the ratchet. The case release 21 will then rotate in the direction of movement of the article under the pressure exerted by the article. As the case release rotates, the case stop plate will move from position A to position B (FIG. 2), releasing the article from the track 1. As the case release 21 rotates, the next case stop plate 24 will be moved from position C to position A. As it moves, it will be released by the restraining plate 11 and will be biased upwardly. When the center of gravity of the article moves beyond the end of the track 1, it will tip, raising its rear end, permitting the stop plate 24, which is moving up from position C, to flip up into erected or almost erected position ready to intercept the next following article (FIG 7). The stop plate 24 will automatically be made stationary at the erected case engaging position by the engagement of the check member 33 with the next tooth 31 of the ratchet wheel 30. The ratchet wheel automatically controls the rotational movement of the release mechanism 21, limiting it to a rotation equal to the spacing between two adjacent case stops in each cycle of operation. Actually, in both embodiments of this invention, the ratchet permits the rotatable member or rotor to move step by step, with each step constituting a station. At each station the rotor dwells and is held stationary. The station where each of the stop plates 24 or the case stops 63 actually operates to arrest the movement of an article constitutes the article interception station. At each of the other stations the stop plates 24 and case stops 63 are functionally inoperative.

The rounded outer ends 28 of the sides of the stop plates facilitate the sliding of the article over stop plates so that the stop plates will not gouge or otherwise lock with the articles. It will be seen that the article, as it noses over or tips off the end of the track 1, always permits the next following stop plate 24 to erect sufficiently to engage the next following case and positively prevent its inadvertent release. Thus, this case release serves as a positive selection of articles one by one. Further, the stop plates 24, being pivotally mounted, cannot become wedged under an article and raise the end of the article so that the article becomes jammed on the end of the track 1. This is also important in assuring positive, dependable operation.

By manipulating the adjustment screw 8 (FIG. 2), the vertical position of the case release 21 can be adjusted to the correct height for optimum operation. It will be recognized, however, that this adjustment feature is not essential to this invention and may be omitted when desired.

The release mechanism 60, like the release mechanism 21, is designed to be operated by the force of articles being released. Assuming the mechanism to be in the position illustrated in FIG. 10, the upper disk 61 will be held against rotation by engagement of the pawl assembly 75 with the ratchet wheel 70. The erected stop plate 63 will project into the path of the articles on the track 1. The pressure of the articles pressing against the stop plate 63 cannot rotate the stop plate about the pivot pin 64 since the pivot pin is held stationary by the immobility of the upper plate 61. The upper plate 61 is held against rotation through the shaft 65 by the ratchet 70 and pawl assembly 75. The lower end of the stop plate 63 is forced into tight bearing with the magnet 72. Thus, the article will be held on the track.

By manipulation of the handle 77, the ratchet wheel 70 may be freed for rotation of one tooth. As soon as this happens, the pressure of the article bearing against the case stop 63 will push the stop plate 63 over, as indicated in FIG. 11. In doing so, the force applied to the stop plate acting through the pin 64 will cause rotation of the upper plate 61 and the parts rigidly assembled. As the article passes over the stop plate, the stop plate will be folded into its aperture 62, where it will remain flat until it once more returns to the area of the notch 71.

As the upper plate 61 rotates, the next following stop plate 63 will be moved into the area of the notch 71. As the leading edge of the next stop plate approaches the notch 71, it will be attracted downwardly against the stationary plate 67 by the magnet 72. As it moves further, the magnet will cause the lower end of the case stop to pivot down through the notch 71, erecting the other end of the stop plate, ready to intercept a case. This erection operation will occur as the article being discharged tips or noses over the end of the track, causing its rearward end to rise sufficiently for erection of the stop plate before the next article makes contact with it. Once again, the stop plates are of a type which will positively intercept the articles one by one and will not become bound under the articles where they could accidentally cause an article to hang up.

As in the case of the release mechanism 21, the handle 77 may be dispensed with and the operation of the mechanism made automatic by suitable controls and the substitution of powered operating means such as a solenoid. It will also be recognized that the article availability sensing system applied to the release mechanism 21 may be applied to this case stop with the same result. This particular case stop provides one with a particularly low silhouette which will have no greater depth than that of the tracks themselves. Thus, it is capable of maximum conservation of storage space by permitting the tracks to be vertically spaced at minimal distances.

This invention provides a release mechanism of simple structure, requiring no expensive prime power source for its operation. The release mechanism is positive and capable of selecting the articles one by one. This is most important, particularly where the mechanism is applied to a fully automatic warehousing operation. When no operator is present, it is vitally important that the number of articles or cases actually released conform exactly to the number selected by the operator. Even where an operator is present, the accidental release of more articles then required causes substantial delay, necessitating restoration of the excess articles to the storage line by the operator. Should the operator accidentally release an article from the wrong line, he may restore it with ease with this release mechanism because it is unnecessary from him to lift it over the release mechanism. It may be restored to the line by pushing it up the track, over the case release. In the case of both the releases 21 and 60, reverse movement of the cases over the release will cause the case stop to pivot flat, permitting the case to pass over it without interference. This is important, particularly where heavy articles are concerned. The bays are normally so designed that there is insufficient clearance on the sides and top of the articles to permit the operator to reach into the bay to support an article while he is lifting it over a case release which does not yield in response to the reverse movement of articles.

Because of the simplicity of the mechanism, it is durable, simple to maintain, and dependable. It is also compact and rapid in operation. All of these are important to the low cost, efficient control of live storage type warehousing.

We claim:

1. An article supporting track biasing articles to move toward one end thereof and an article release mounted on said track, said article release comprising: a hub and means mounting said hub for rotation in the direction of bias of said articles; a plurality of article intercepter fingers, said fingers being individually, pivotally mounted at equal spacings on said hub; each of said fingers being pivotally movable from an erected attitude projecting generally, radially, outwardly from said hub to a retracted attitude extending generally circumferentially of said hub; means biasing each of said fingers in the direction of rotation of said hub into erected attitude and at at least one position along said hub's path of rotation said fingers being free to move to erected position; stop means holding said fingers against further pivotal movement in a direction of bias when said fingers have reached said generally, radially, projecting position; a step-by-step control element for said hub holding said hub against rotation at each segment of its rotation when one of said fingers reaches said one position; each of said fingers in erected position being in front of an article and adapted to intercept the article on said track and hold it against movement past said hub; means pivoting each of said fingers oppositely to the direction of rotation of said hub and holding each of said fingers in retracted attitude as said fingers approach said one position of said hub and releasing each finger ahead of the article it is to intercept; the bias of the intercepted article against the fingers applying the rotative force to said article release.

2. An article supporting track biasing articles to move toward one end thereof and an article release mounted on said track, said article release comprising: a bracket adapted to be secured to said track; a hub rotatably mounted on said bracket, and a ratchet associated with said hub controlling its step-by-step rotation through a predetermined number of circumferential stations, one of said stations being an article interception station; said hub having a disklike plate; a plurality of circumferentially equally spaced pins mounted on said plate; an article interception finger pivotally mounted on each pin at a point intermediate the ends of said finger; a stop on said plate intercepting each of said fingers and limiting its rotation in the same direction as said hub, said fingers when bearing against said stop being in erected attitude and projecting generally radially outwardly a substantial distance from said hub; a resilient element urging said fingers into erected attitude in front of an article; means rotating each of said fingers oppositely to the direction of rotation of said hub and into retracted attitude as said fingers are moved past said means by rotation of said hub; in retracted position said fingers lying generally circumferentially of said hub; said means being immediately ahead of said article interception station and releasing each finger ahead of the article it is to intercept; the bias of the intercepted article supplying the rotative force for said hub.

3. An article track along which articles are biased to move toward one end thereof and an article release mounted at said one end of said track, said article release comprising: a stationary disklike plate and means mounting said plate to said track generally parallel to the plane of the top of said track; said plate defining an aperture on the side thereof adjacent the center of said track; a rotatable plate mounted above said stationary plate; said rotatable plate having a plurality of equally spaced finger apertures therein; an article interception finger rotatably mounted midway between its ends in each of said finger apertures, said fingers each being normally positioned parallel with said rotatable plate and said stationary plate holding said fingers against rotation; a ratchet associated with said rotatable plate and controlling its step-by-step rotation through a predetermined number of circumferentially spaced stations, the number of said stations being equal to the number of said fingers; one of said stations being an article interception station and said aperture in said stationary plate being positioned at said station; means at said article interception station to urge one end of each of said fingers to rotate downwardly through said aperture in said stationary plate and the other end to be erected in article restraining position, said ratchet holding said rotatable plate stationary when said finger is erected substantially normal to said rotatable plate, said one end of said finger when said finger is so erected bearing against a wall of said aperture in said stationary plate.

References Cited in the file of this patent

UNITED STATES PATENTS

| | | |
|---|---|---|
| 760,802 | Norris et al. | May 24, 1904 |
| 1,022,753 | Pitts et al. | Apr. 9, 1912 |
| 1,352,411 | Hutton | Sept. 7, 1920 |
| 1,854,943 | Kunath | Apr. 19, 1932 |
| 1,985,518 | Royden | Dec. 25, 1934 |
| 2,693,898 | Epperson | Nov. 9, 1954 |
| 2,738,103 | Bisese | Mar. 13, 1956 |
| 2,786,578 | De Graaf et al. | Mar. 26, 1957 |
| 2,941,643 | Donnelly | June 21, 1960 |
| 2,969,863 | Woldring et al. | Jan. 31, 1961 |

FOREIGN PATENTS

| | | |
|---|---|---|
| 137,399 | Austria | Apr. 25, 1934 |